United States Patent
Sejnoha et al.

(10) Patent No.: US 8,745,025 B2
(45) Date of Patent: *Jun. 3, 2014

(54) METHODS AND APPARATUS FOR SEARCHING THE INTERNET

(71) Applicants: Vladimir Sejnoha, Lexington, MA (US); Gunnar Evermann, Boston, MA (US); Marc W. Regan, Cambridge, MA (US); Stephen W. Laverty, Somerville, MA (US)

(72) Inventors: Vladimir Sejnoha, Lexington, MA (US); Gunnar Evermann, Boston, MA (US); Marc W. Regan, Cambridge, MA (US); Stephen W. Laverty, Somerville, MA (US)

(73) Assignee: Nuance Communications, Inc., Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/685,059

(22) Filed: Nov. 26, 2012

(65) Prior Publication Data
US 2013/0124495 A1    May 16, 2013

Related U.S. Application Data

(63) Continuation of application No. 12/877,440, filed on Sep. 8, 2010, now Pat. No. 8,341,142.

(51) Int. Cl.
*G06F 17/30* (2006.01)

(52) U.S. Cl.
CPC .............................. *G06F 17/30637* (2013.01)
USPC ........... 707/707; 707/759; 707/760; 707/767; 707/810

(58) Field of Classification Search
CPC .................... G06F 17/30864; G06F 17/30554; G06F 17/30637; G06F 17/30967; G06F 17/30991
USPC .................. 707/706, 707, 759, 760, 767, 810
See application file for complete search history.

(56) References Cited

U.S. PATENT DOCUMENTS

| | | | |
|---|---|---|---|
| 7,058,626 B1 * | 6/2006 | Pan et al. | 707/999.004 |
| 8,239,366 B2 | 8/2012 | Sejnoha et al. | |
| 8,341,142 B2 | 12/2012 | Sejnoha et al. | |
| 8,392,392 B1 * | 3/2013 | Ruf | 707/706 |

(Continued)

FOREIGN PATENT DOCUMENTS

| | | |
|---|---|---|
| EP | 1 072 984 A2 | 1/2001 |
| EP | 1 148 412 A2 | 10/2001 |

OTHER PUBLICATIONS

Meng. W. et al., "Building Efficient and Effective Metasearch Engines," ACM Computing Surveys, Mar. 1, 2002, pp. 48-89, vol. 34, No. 1.

(Continued)

*Primary Examiner* — Phong Nguyen
(74) *Attorney, Agent, or Firm* — Wolf, Greenfield & Sacks, P.C.

(57) ABSTRACT

Some embodiments relate to performing a search for content via the Internet, wherein user input specifying a search query is supplied to a mobile communications device, such as, for example, a smartphone. The mobile communications device separately issues the search query to a plurality of search engines and can receive the results from each search engine and display the results to the user. Thus, the user does not have to separately issue the query to each of the plurality of search engines.

19 Claims, 11 Drawing Sheets

(56) References Cited

U.S. PATENT DOCUMENTS

| | | | |
|---|---|---|---|
| 2004/0030688 A1* | 2/2004 | Aridor et al. | 707/3 |
| 2006/0002607 A1* | 1/2006 | Boncyk et al. | 382/165 |
| 2006/0129530 A1* | 6/2006 | Beavers et al. | 707/3 |
| 2006/0136375 A1 | 6/2006 | Cox et al. | |
| 2007/0050339 A1* | 3/2007 | Kasperski et al. | 707/3 |
| 2007/0174244 A1* | 7/2007 | Jones | 707/3 |
| 2008/0016147 A1* | 1/2008 | Morimoto | 709/203 |
| 2008/0021887 A1 | 1/2008 | Brinson, Jr. et al. | |
| 2008/0201304 A1* | 8/2008 | Sue | 707/3 |
| 2008/0294603 A1* | 11/2008 | Ranjan et al. | 707/3 |
| 2010/0299342 A1* | 11/2010 | Gustafson et al. | 707/759 |
| 2010/0312782 A1* | 12/2010 | Li et al. | 707/769 |
| 2011/0119242 A1* | 5/2011 | Chen et al. | 707/706 |
| 2012/0059658 A1 | 3/2012 | Sejnoha et al. | |
| 2012/0059810 A1 | 3/2012 | Sejnoha et al. | |
| 2012/0059814 A1 | 3/2012 | Sejnoha et al. | |
| 2012/0060113 A1 | 3/2012 | Sejnoha et al. | |
| 2012/0233207 A1* | 9/2012 | Mohajer | 707/769 |
| 2012/0259636 A1 | 10/2012 | Sejnoha et al. | |
| 2013/0018863 A1 | 1/2013 | Regan et al. | |
| 2013/0018864 A1 | 1/2013 | Regan et al. | |
| 2013/0018865 A1 | 1/2013 | Regan et al. | |
| 2013/0018867 A1 | 1/2013 | Regan et al. | |
| 2013/0019202 A1 | 1/2013 | Regan et al. | |
| 2013/0086025 A1 | 4/2013 | Hebert | |
| 2013/0086026 A1 | 4/2013 | Hebert | |
| 2013/0086027 A1 | 4/2013 | Hebert | |
| 2013/0086028 A1 | 4/2013 | Hebert | |
| 2013/0086029 A1 | 4/2013 | Hebert | |
| 2013/0144857 A1 | 6/2013 | Sejnoha et al. | |

OTHER PUBLICATIONS

International Search Report and Written Opinion for International application No. PCT/US2011/050669 mailed Sep. 26, 2012.

International Preliminary Report on Patentability for International application No. PCT/US2011/050669 mailed Mar. 21, 2013.

* cited by examiner http://www.google.com/search?hl=en&source=hp&q=miles+davis
http://www.bing.com/search?q=miles+davis
Http://en.wikipedia.org/w/index.php?search=miles+davis

METHODS AND APPARATUS FOR SEARCHING THE INTERNET

RELATED APPLICATIONS

This Application claims priority under 35 U.S.C. §120 and is a continuation of U.S. patent application Ser. No. 12/877,440, entitled "METHODS AND APPARATUS FOR SEARCHING THE INTERNET," filed on Sep. 8, 2010, which is herein incorporated by reference in its entirety.

BACKGROUND

1. Field of Invention

The techniques described herein are directed generally to the field of issuing search queries via the Internet.

2. Description of the Related Art

The Internet is a global system of interconnected computer networks that store a vast array of information. The World Wide Web (WWW) is an information sharing model built on top of the Internet, in which a system of interlinked hypertext documents are accessed using particular protocols (i.e., the Hypertext Transfer Protocol and its variants).

Because of the enormous volume of information available via the WWW and the Internet, and because the available information is distributed across an enormous number of independently owned and operated networks and servers, locating desired content on the WWW and the Internet presents challenges.

Search engines have been developed to aid users in locating desired content on the Internet. A search engine is a computer program that receives a search query from a user (e.g., in the form of a set of keywords) indicative of content desired by the user, and returns information and/or hyperlinks to information that the search engine determines to be relevant to the user's search query.

Search engines typically work by retrieving a large number of WWW web pages and/or other content using a computer program called a webcrawler that browses the WWW in an automated fashion (e.g., following every hyperlink that it comes across in each web page that it browses). The retrieved web pages and/or content are analyzed and information about the web pages or content is stored in an index. When a user issues a search query to the search engine, the search engine uses the index to identify the web pages and/or content that it determines to best match the user's search query and returns a list of results with the best-matching web pages and/or content. Frequently, this list is in the form of one or more web pages that include a set of hyperlinks to the web pages and/or content determined to best match the user's query.

There are at least two general types of search engines accessible via the Internet: general-purpose search engines and site-specific search engines. As used herein, the term "general-purpose search engine" is defined to mean a search engine that provides search results that include web pages and/or content (or hyperlinks to web pages and/or content) hosted on at least two different and independent web sites or domains. General purpose search engines attempt to index and provide search results from content distributed across a wide swath of the Internet. Examples of general purpose search engines include Google™, operated by Google, Inc. of Mountain View, Calif.; Yahoo!™, operated by Yahoo!, Inc. of Sunnyvale, Calif.; and Bing™, operated by Microsoft Corp. of Redmond, Wash.

As used herein, the term "site-specific search engine" is defined to mean a search engine that provides search results that include web pages and/or content (or hyperlinks to web pages and/or content) hosted on only one web site or domain. Site-specific search engines are frequently used by operators of web sites to allow users to find specific web pages or content on their web sites. For example, the web site of an online retailer (or "e-tailer") may include a site-specific search engine that facilitates a user locating web pages for products sold by the retailer.

SUMMARY

One embodiment is directed to a method, implemented at least in part via at least one hardware computer processor of a mobile communications device, of performing a search for content via the Internet, the method comprising: receiving, at the mobile communications device, user input specifying a first search query; issuing at least one second search query from the mobile communications device to a plurality of search engines, wherein the at least one second search query is based, at least in part, on the content of the first search query. Another embodiment is directed to at least one computer-readable medium encoded with instructions that, when executed, perform the above-described method.

A further embodiment is directed to a mobile communications device comprising: at least one tangible memory that stores processor-executable instructions for performing a search for content via the Internet; and at least one hardware computer processor, coupled to the at least one tangible memory, that executes the processor-executable instructions to: receive, at the mobile communications device, user input specifying a first search query; issue at least one second search query from the mobile communications device to a plurality of search engines, wherein the at least one second search query is based, at least in part, on the content of the first search query.

Another embodiment is directed to a method, implemented at least in part via at least one hardware computer processor, of facilitating a search for content via the Internet, the method comprising: receiving a first search query from a client device; identifying at least one search engine to be queried; generating at least one second search query, wherein the at least one second search query is generated based, at least in part, on the content of the first search query; and sending, to the client device, the at least one second search query and information specifying the identified at least one search engine to be used in performing an Internet search using at least one second search query. A further embodiment is directed to at least one computer-readable medium encoded with instructions that, when executed, perform the above-described method.

Another embodiment is directed to a system comprising: at least one tangible memory that stores processor-executable instructions for facilitating a search for content via the Internet; and at least one hardware computer processor, coupled to the at least one tangible memory, that executes the processor-executable instructions to: receive a first search query from a client device; identify at least one search engine to be queried; generate at least one second search query, wherein the at least one second search query is generated based, at least in part, on the content of the first search query; and send, to the client device, the at least one second search query and information specifying the identified at least one search engine to be used in performing an Internet search using at least one second search query.

BRIEF DESCRIPTION OF DRAWINGS

In the drawings:

FIG. 9 is a diagram showing Universal Resource Locators (URLs) that may be generated to query multiple search engines, in accordance with some embodiments;

DETAILED DESCRIPTION

The inventors have recognized that for a given user-generated search query, the user may be interested in different types of information pertaining to that search query. For example, for the search query "Miles Davis," the user may be interested in obtaining biographical information about Miles Davis, listening to samples of or purchasing Miles Davis' music, and/or social networking with others who are interested in Miles Davis. Historically, to obtain these three different types of information, a user would enter the search string "Miles Davis" into three different search engines. For example, the user would enter this search string into the search engine for an encyclopedia web site to obtain biographical information, would enter the search string into the search engine for a web site that sells music to listen to or purchase music, and would enter the search string into the search engine of a social networking site to connect with others. The inventors have recognized that this process is often time consuming and laborious, as the user must navigate to multiple different web sites (and potentially manage multiple different browser windows or tabs) and enter the same search string repeatedly.

Figure 1:
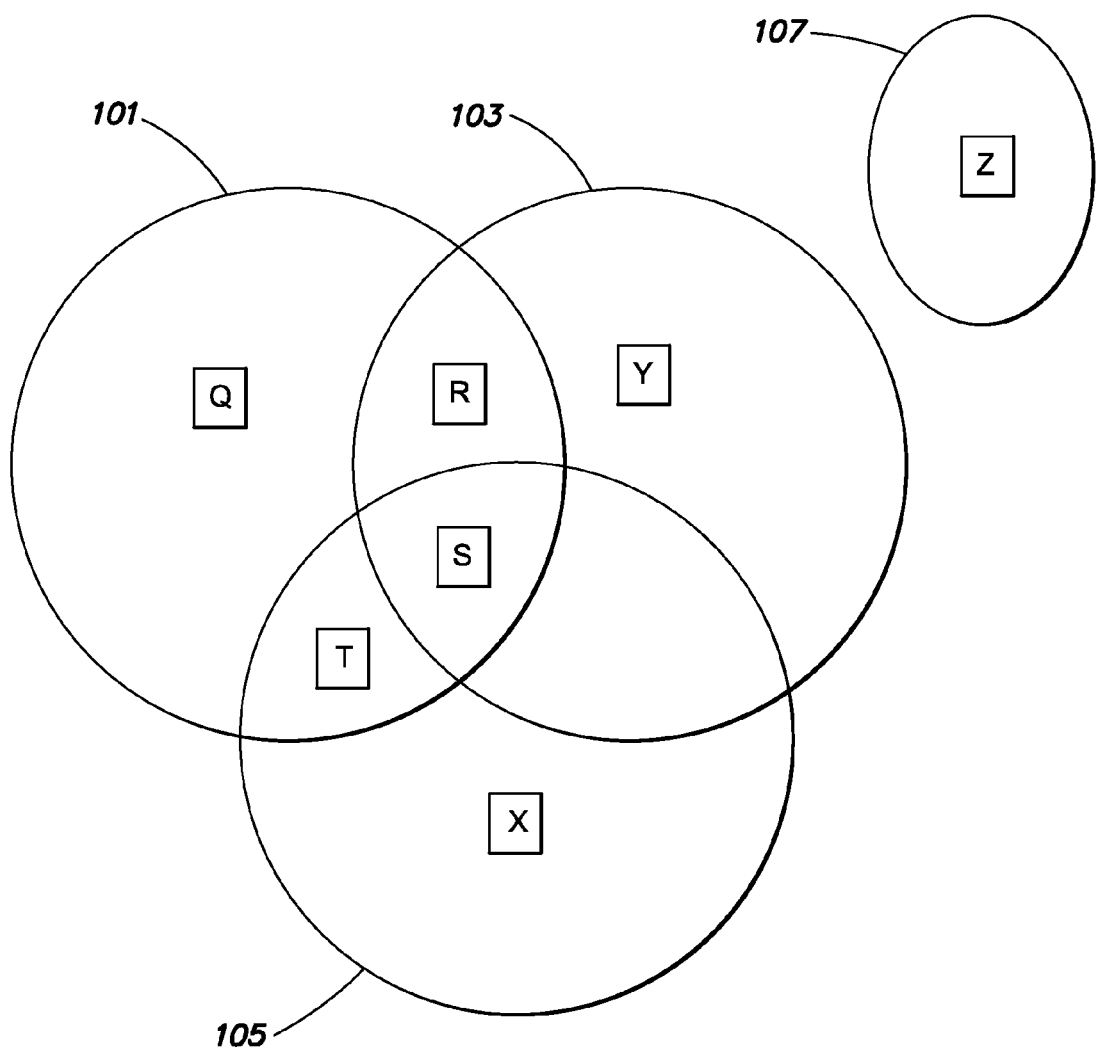
FIG. 1 is a Venn diagram showing sets of search results from multiple different search engines.

The inventors have also recognized that, because different search engines index web pages and/or content in different ways, index different universes of content, and/or use different algorithms to determine which web pages and/or content best match a particular search query, different search engines may provide different (though possibly overlapping) sets of search results in response to the same search query. This concept is illustrated by the Venn diagram in FIG. 1. Each set depicted in the Venn diagram of FIG. 1 represents the search results from one of four hypothetical search engines (i.e., search engine one, search engine two, search engine three, and search engine four) provided in response to a user-provided search query for the keywords "Miles Davis." In FIG. 1, set 101 includes results provided from search engine one and include search results "Q," "R," "S," and "T." Set 103 includes results provided from search engine two and includes results "R," "S," and "Y." Set 105 includes results provided from search engine three and includes results "S," "T," and "X." Set 107 includes results provided from search engine four and includes result "Z." As shown in FIG. 1, some search results are included only in one of the sets and, as such, are returned from only of the four search engines, while other search results are included in multiple of the sets and, as such, are returned from two or more of the search engines.

When a search engine returns a set of search results in response to a search query, the search engine generally returns the results in an ordered list. The list may be ordered by relevance, may be ordered based on money paid for higher positions in the search results, and/or may be ordered based on other criteria. For example, web pages or content that a search engine has determined to be most relevant are at the top of the list of the results, while web pages or content that the search engine has determined to be less relevant are farther down in the list of results. As another example, a particular electronics manufacture may pay an electronics e-tailer to list its televisions higher up in the list when users enter search queries including the word "television" into the site-specific search engine for the e-tailer's web site.

The inventors have appreciated that, because different search engines use different algorithms to determine in what order web pages and/or content are to be listed in the search results, even in a situation in which two different search engines include the same web page or piece of content in their search results in response to a particular search query (e.g., "Miles Davis"), that web page or piece of content may be at or near the top of the list of results provided by a first of the two search engines (e.g., because the first search engine has determined the web page or piece of content to be particularly relevant in the universe of content in evaluates), but may be further down the list of results provided by a second of the two search engines (e.g., because the second of the two search engines has determined the web page or piece of content to be less relevant in the universe of content it evaluates). Similarly, some results that are listed near the top of the list of search results from the second search engine may be listed much lower in the list of results provided by the first engine. The inventors have recognized that users are more likely to notice and access results that are near the top of the list. Thus, by using only one of the two search engines, a user may not notice or access results that may be highly relevant to the user.

As such, the inventors have recognized that issuing a user-specified search query to only a single search engine increases the chances of some web pages and/or pieces of content that are potentially relevant not being included the search results or being listed low enough in the returned list of search results that the user disregards them. In addition, the inventors have recognized that issuing such a search query to only a single search engine may limit the content that is returned to only the type of content that is search and/or indexed by that search engine, while the user may be interested in many different types of content pertaining to that search query.

Some web-based software programs, referred to as metasearch engines or search engine aggregators, have been developed that receive a user-specified search query, issue the search query to multiple search engines, receive results from each of these search engines, remove duplicates, aggregate these search results into a single list, and display this list of aggregated search results to the user. One example of such a metasearch engine is Dogpile™, operated by Infospace, Inc.

of Bellevue, Wash. However, the inventors have recognized that these metasearch engines have a number of disadvantages.

First, the search engines that are queried by these metasearch engines include only general-purpose search engines, and do not include any site-specific search engines.

Second, because metasearch engines, in response to a user-specified search query, display to the user a single list of aggregated search results from a number of different search engines, the user has no ability to see which search engine provided which search result, to see how relevant each of the plurality of search engines deemed a particular search result to be, or to look at the full set of results returned from any particular search engine.

Third, metasearch engines run on one or more servers that receive a user-specified search query issued from a browser or other software application executing on the user's client device and issue the search query from the server(s) to the plurality of search engines that are to be queried. Because a metasearch engine may receive search queries from and provide aggregated search results to a large number of users, the server(s) on which the metasearch engine operates may regularly issue a very large number of search queries to the search engines whose results it aggregates. One consequence of this is that a search engine may receive hundreds of thousands or even millions of search queries daily from the same server or IP address, and may perceive this behavior as a single user issuing an enormous number of search queries to the search engine. Many search engine operators would consider this behavior to be an abuse of the search engine service and/or a potential denial of service attack and would take action to block search queries to their search engines from an IP address issuing such a large number of queries. For this reason, a metasearch engine operator must typically obtain contractual agreements with the search engine operators whose search engine results are aggregated by the metasearch engine to allow the metasearch engine to issue a large number of search queries to these search engines.

Fourth, these metasearch engines do not provide any capability for the user to control to which search engines his or her search query is to be provided. Rather, existing metasearch engines have a fixed set of search engines to which every search query is provided. Thus, the user has no control over which search engines' results are provided in response to a search query and the metasearch engines do not perform any customization of which search engines are queries based on which user issued the search query or based on the content of the user's search query.

Some embodiments described below are directed to techniques related to issuing a user-specified search query to multiple search engines and/or displaying the results of such queries to users. While some of the embodiments discussed below address all of the above-discussed deficiencies of existing metasearch engines, not every embodiment addresses all of the above-discussed deficiencies of metasearch engines, and some embodiments do not address any of these deficiencies. As such, it should be understood that the invention is not limited to embodiments that address all or any of the above-described deficiencies of metasearch engines.

Figure 2:
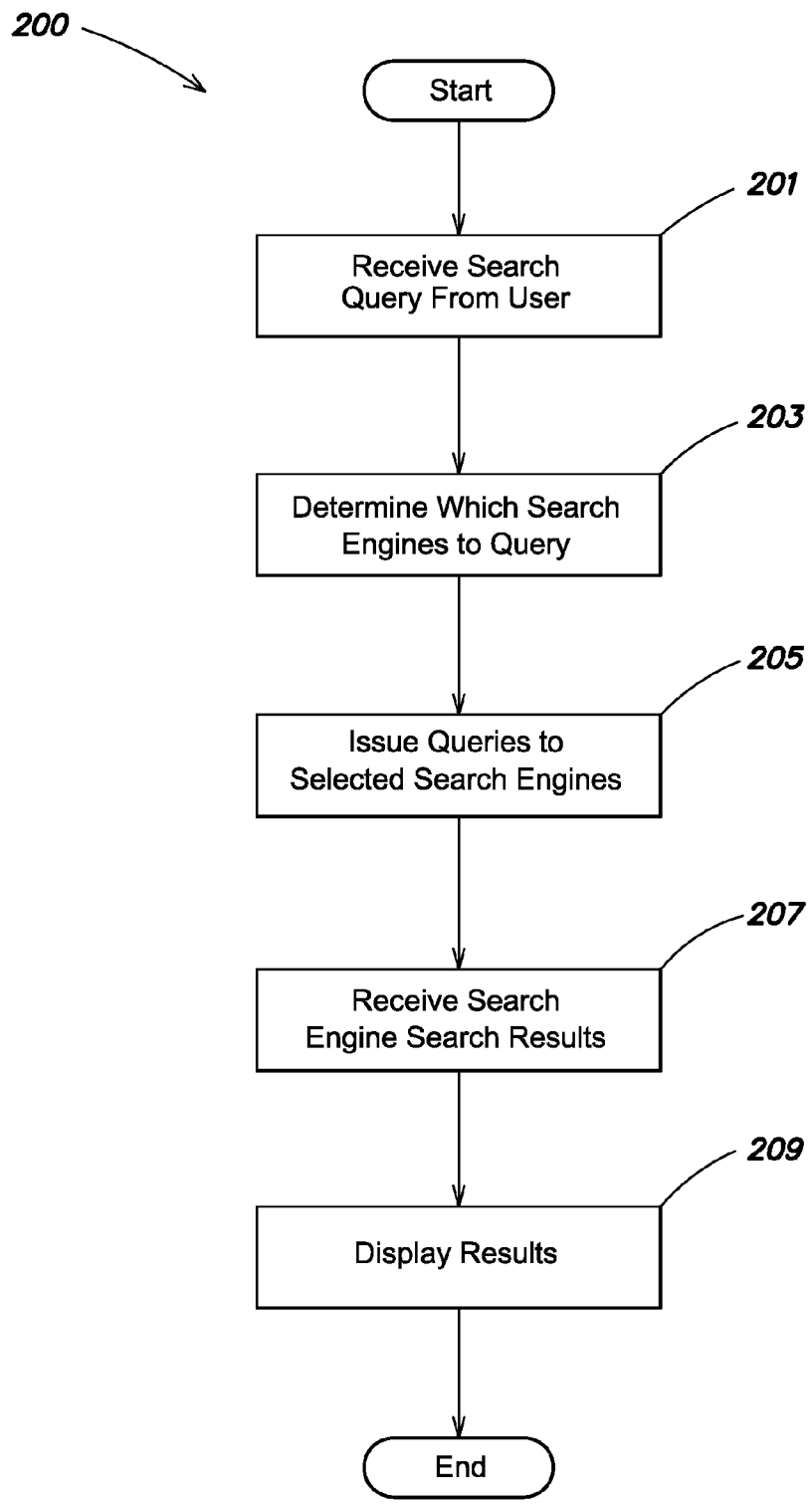
FIG. 2 is a flow chart of an illustrative process for sending search queries to and receiving search results from multiple search engines, in accordance with some embodiments.

FIG. 2 is a flow chart of an illustrative process 200 that may be performed, in some embodiments, by an application program executing on a user's client device to issue a search query to multiple search engines and to display the search results from each of these search engines to the user. The client device upon which the application program executes to perform process 200 may be any type of computing device that has hardware capable of executing a software computer program. Examples of types of client devices that may be used include a laptop or desktop personal computer, a personal digital assistant (PDA), a mobile phone, a server computer, and/or various other types of computing devices. In one particular implementation described herein, the techniques described below may be implemented on a mobile telephone (e.g., a smartphone) and combined with a speech recognition capability so that the user may issue search queries by voice, but all aspects of the invention are not limited to use on mobile phones or to use with a speech recognition interface.

As may be understood from the description above, process 200 permits a user to launch an application program on the client device, input a search query (e.g., by voice or by text), and view search results for that search query provided from multiple different search engines.

Figure 3:
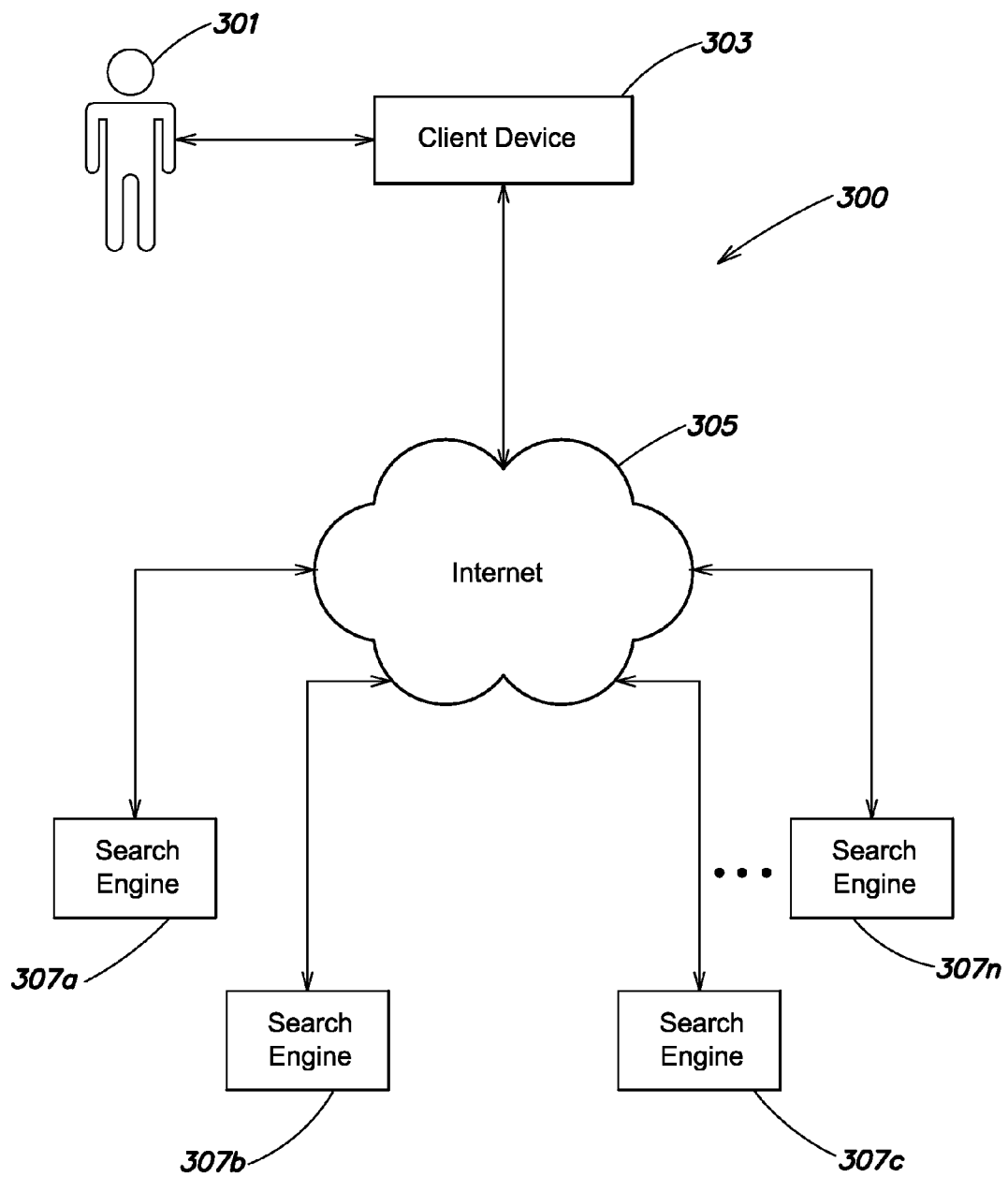
FIG. 3 is a block diagram of a computer environment in which some embodiments may be implemented.

One non-limiting example of an environment in which process 200 may be performed is in the networked computer environment 300 shown in FIG. 3. In FIG. 3, user 301 accesses the internet 305 via a client device 303. Search engines 307*a*, 307*b*, 307*c*, . . . , and 307*n* execute on servers that are accessible via the Internet 305. Process 200 begins at act 201, where the application program executing on the client device 303 receives a user-specified search query. As discussed in greater detail below, the query may be received in any of a variety possible ways via any of a variety of possible client device user interfaces. The process next continues to act 203, where the application program determines, in response to receiving the user-specified query, which of search engines 307 to query. As discussed in detail below, the set of search engines to be queried may be determined dynamically and may be user-configurable, though aspects of the invention are not limited in this respect as in some embodiments the set of search engines to be queried may be static and not configurable.

The process next proceeds to act 205, where the application program issues, via the Internet 305, search queries, generated based on the user-specified search query received in act 201, to the search engines 307 identified in act 203. In some embodiments, these search engines may include general-purpose search engines and/or site-specific search engines, but the invention is not limited in this respect as in some embodiments only site-specific search engines or only general-purpose search engines may be queried. The process next continues to act 207, where the application program receives, via the Internet 305, search results from the search engines queried in act 205. The process then proceeds to act 209, where the search results are displayed to the user via a display on client device 303.

It should be appreciated that process 200 depicts one illustrative order in which acts 201, 203, 205, 207, and 209 may be performed. Various other orders are possible, and these acts may be performed in different orders in various different embodiments. Additionally, various possible implementations of each of the acts of process 200 are possible and are discussed in greater detail below.

I. Receiving a Search Query

As discussed above, at act 201 of process 200, the application program receives user input specifying a search query. This user input may be received in any of a variety of ways and in any of a variety of formats. For example, in some embodiments, the user input may be received as text and may be received via an input device integrated into or coupled to the client device. Examples of such input devices include a keyboard, a touch screen, a mouse, and/or any other input device via which a user may provide text input to a computing device.

In some embodiments, the user input may be received as audio via a microphone that is integrated into or coupled to the client device. For example, a user may speak a search query into the microphone and the application program may receive the user's voice input as audio data. Automated speech recognition may be performed on the audio data to obtain a recognition result (e.g., in textual form) that may be used as the basis for querying search engines. In some embodiments, one or more of the search engines to be queried may have a speech interface. In such embodiments, the audio may be provided to such search engines instead of, for example, providing a text search query based on automated speech recognition of the audio. Automated speech recognition techniques are well known, and any of a variety of automated speech recognition techniques may be used to obtain a recognition result for the audio data.

In some embodiments, the client device may provide a number of different options from which the user may select to provide a search query. For example, in some embodiments, the client device may permit the user to input the query either in voice format (e.g., by speaking the query into a microphone) or in text format (e.g., by typing the query on a keyboard or a touchscreen).

Figure 4:
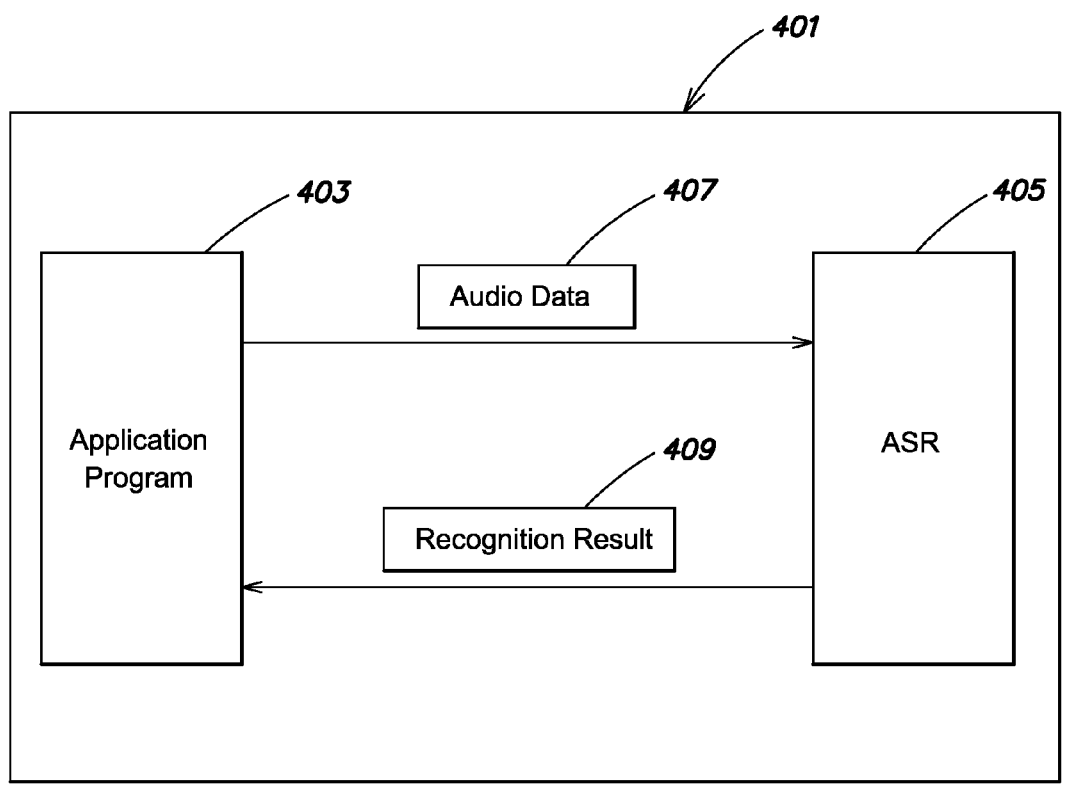
FIG. 4 is a block diagram of a client device that executes an application program for querying multiple search engines and an automated speech recognizer for performing speech recognition on voice search queries, in accordance with some embodiments.

In embodiments in which automated speech recognition of voice input is performed, the automated speech recognition of the user-supplied audio data may be accomplished in any of a variety of ways. For example, as shown in FIG. 4, in some embodiments, the client device may execute an automated speech recognizer, which is a software program that performs automated speech recognition on audio data, and the application program may use the automated speech recognizer to obtain a recognition result of the audio data. In FIG. 4, client device 401 executes the application program 403 that performs process 200 and an automated speech recognizer 405. When application program 403 receives user-supplied audio data 407, it may pass the audio data to automated speech recognizer 405. Automated speech recognizer 405 may perform automated speech recognition on the audio data to obtain a recognition result 409 and may return recognition result 409 to application program 403 for use in formatting queries for the speech engines.

The inventors have recognized that some client devices may not have sufficient computing resources to execute an automated speech recognizer that operates with a desired level of accuracy and/or efficiency. That is, for example, a client device may not have sufficient memory to store acoustic models, language models, grammars, and/or other components of such a speech recognizer and/or may not have a processor powerful enough to perform automated speech recognition at a desired level of efficiency. This may occur in any number of situations, particularly when client device is a handheld device, such as a PDA or mobile phone.

Figure 5:
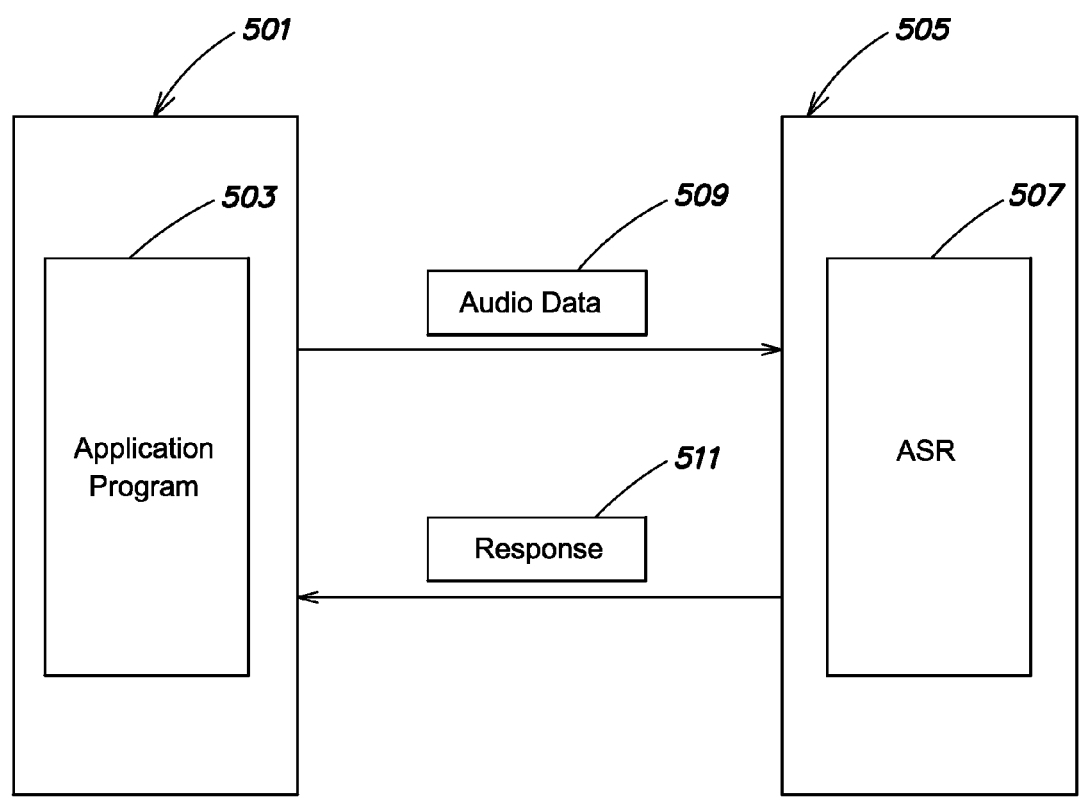
FIG. 5 is a block diagram of a client device that executes an application program for querying multiple search engines and server that executes an automated speech recognizer and provides speech recognition services for the client device to perform speech recognition on voice search queries, in accordance with some embodiments.

Thus, in some embodiments, automated speech recognition on audio data supplied from a user may be performed by a computer external to the client device executing the application program that receives user input and manages searches based on such input. For example, as shown in FIG. 5, client device 501 executes application program 503 that receives voice input supplied by a user in the form of audio data. Automated speech recognition may be performed on the audio data by an automated speech recognizer 507 executing on a server 505. Thus, as shown in FIG. 5, in some embodiments, application program may send the user-supplied audio data 509 to automated speech recognizer 507 executing on server 505. The audio data 509 may be sent to the automated speech recognizer in any of a variety of possible ways. For example, in some embodiments, the user-supplied audio may be captured by a microphone and analog-to-digital conversion may be performed on the captured microphone audio to generate digital audio data. This digital audio data may be supplied to automated speech recognizer 507. In some embodiments, some processing of the digital audio data may be performed prior to sending this data to the automated speech recognizer. For example, the digital data may be compressed or some pre-processing may be performed to extract parameters of the audio that are useful in automated speech recognition. The extracted parameters may be passed to automated speech recognizer 507 with the audio data. In embodiments that use compression, any of a variety of possible compression algorithms may be used. For example, in some embodiments, the Speex™ codec may be used.

Thus, it should be appreciated that, as used herein, the term "audio data" may refer to an analog audio signal or a digital representation or compressed digital representation of an analog audio signal.

Automated speech recognizer 507 may perform automated speech recognition on audio data 509 and return to application program 503 a response 511 that comprises results from audio data 509. The results may take any suitable form. As one non-limiting example, the results may comprise a text recognition result obtained by automated speech recognizer 507 from performing automated speech recognition on the audio data.

In the example of FIG. 5, client device 501 is depicted as communicating directly with server 505. It should be appreciated that this depiction is provided merely to facilitate an understanding of the types of information sent between client device 501 and server 505, and that client device 501 may communicate with server 505 in any of a variety of ways and via any suitable communication medium, including, for example, via the Internet.

In the example of FIG. 4, automatic speech recognition on audio data received at a client device is performed on the client device, and in the example of FIG. 5, audio data is provided from the client device to a server and the server perform automatic speech recognition on the server. However, in some embodiments, automatic speech recognition may be performed partially by the client device and partially by the server. For example, a portion of an ASR may execute on the client and a portion may execute on the server. This may be done, for example, to enable the client device to perform a portion of the speech recognition process, but leave computationally intensive portions for the server.

Figure 6:
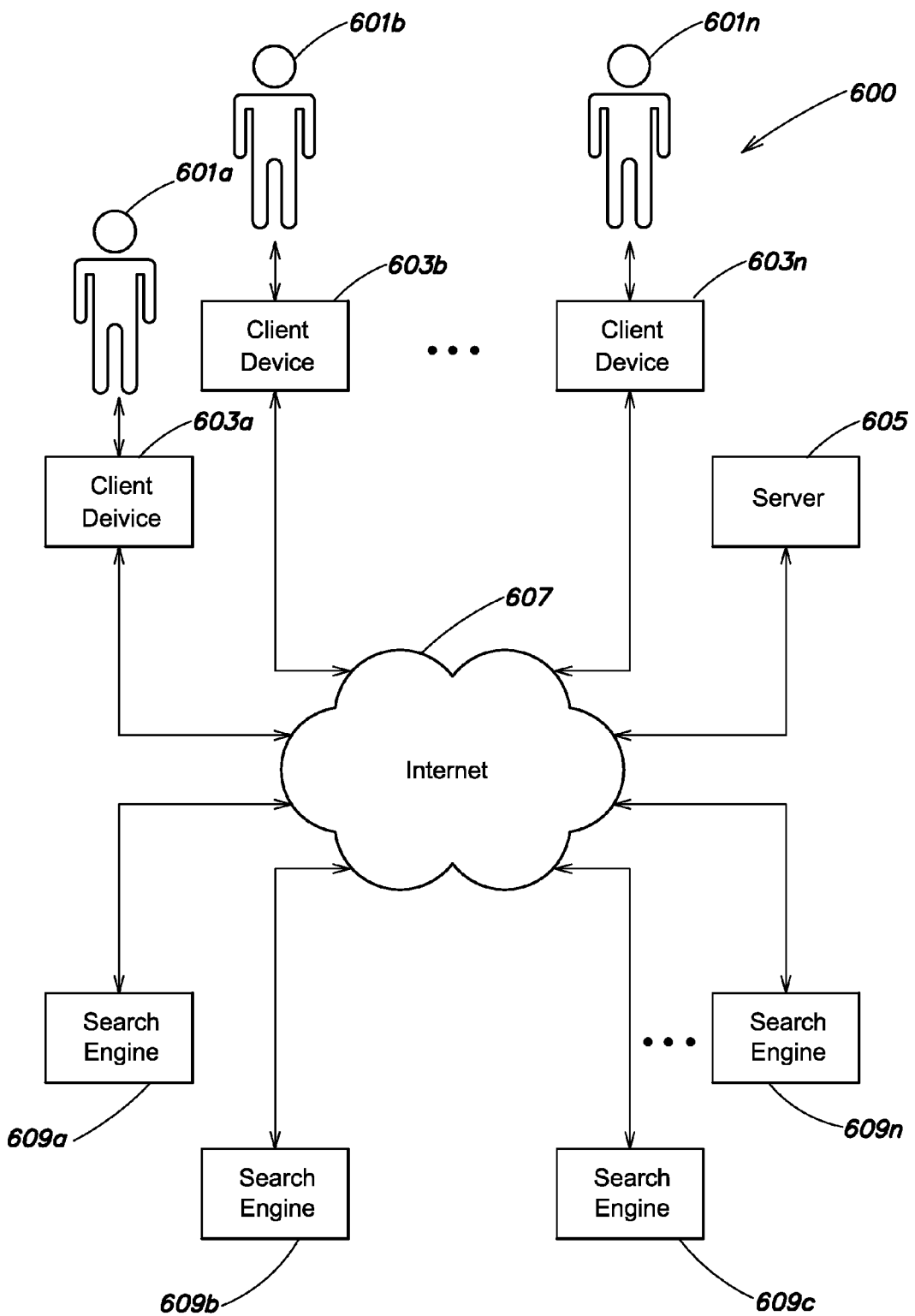
FIG. 6 is a block diagram of a computing environment in which some embodiments may be implemented.

In some embodiments, server 505 may provide automated speech recognition services for multiple client devices. FIG. 6 shows a computing environment in which each of a plurality of users 601a, 601b, . . . 601n operates a client device 603a, 603b, . . . , 603n. Each client device 603 may execute an application program that performs process 200 of FIG. 2 to send search queries via the Internet 607 to search engines 609a, 609b, 609c, . . . , 609n, and to display the results of these search queries to their respective users. Server 605 may provide automated speech recognition services.

Thus, in embodiments in which client devices 603 receive user-supplied search queries in the form of audio data, the client devices 603 may send the audio data to server 605 to have automated speech recognition performed on the audio data, and may receive a recognition result and/or other information based on the recognition result in response.

In the example discussed above, server 605 provides automated speech recognition services for client devices 603. In some alternate embodiments, server 605 may provide additional functionality to facilitate issuance of search queries from a client device 603 to one or more of search engines 609.

Some examples of this additional functionality are described in detail below. For the sake of simplicity, in the example of FIG. 6, only one server 605 is depicted. However, it should be understood that, as is conventional for Internet servers that receive a high volume of traffic, any number of servers may be used to provide the functionality of server 605 that is described herein and the traffic load from client devices 603 may be balanced across these servers using any of a variety of load balancing techniques.

In embodiments in which a user supplies a search query by voice (i.e., in the form of audio data), a number of techniques may be used to facilitate automated speech recognition of the audio data to generate search queries. These techniques may be employed both in embodiments in which automated speech recognition is performed on the client device and in embodiments in which automated speech recognition is performed on a computer external to the client device.

Figure 7:
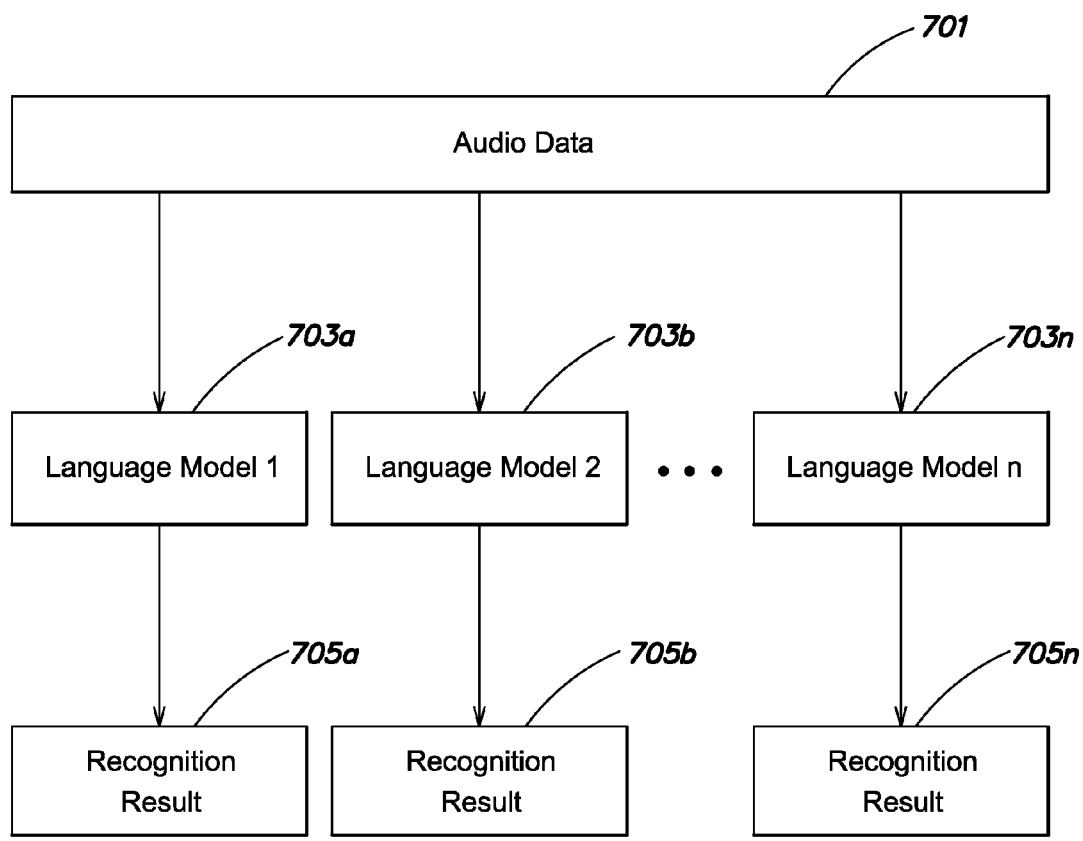
FIG. 7 is a block diagram in which audio data of a voice speech query is recognized using multiple different language models, in accordance with some embodiments.

In some embodiments, the language model that is used by the automated speech recognizer in performing speech recognition on the audio data of the user-supplied search query may be selected based on the search engine(s) which are to be queried. For example, as shown in FIG. 7, in some embodiments, the automated speech recognizer may perform recognition on the same audio data using multiple different language models to yield multiple different recognition results. In FIG. 7, speech recognition is performed on audio data 701 using language models 703a, 703b, . . . , 703n to generate recognition results 705a, 705b, . . . , 705n. Depending on the content of audio data 701 and the differences between language models 703, each of recognition results 705 may be the same, each may be different from the others, or some may be the same and some may be different. One or more of language models 703 may be associated with a particular search engine and the recognition result generated using a language model that is associated with a particular search engine may serve as the basis for the search query that is issued to that search engine.

Thus, for example, in some embodiments, a language model that has been trained on the content that is indexed by a particular search engine may be used to generate the recognition result that serves as the basis for the query that is issued to that search engine. This results in a query that is more likely to yield relevant search results for that search engine.

This technique may be particularly useful when issuing queries to site-specific search engines that index a limited amount of content that is generally directed to a particular subject area. For example, an online shoe retailer may have a site-specific search engine for its e-commerce web site. As such, the content of this web site may include shoe-specific terminology and phrases, such as the name of shoe brands and models, descriptions of shoe properties, and various other shoe-specific information. By training the language model used by a speech recognizer on the content of this web site, the recognizer is more likely to accurately recognize speech that includes the shoe-specific terminology and phrases.

Thus, for example, if a user-supplied search query in the form of audio input is received and is to be issued to both a site-specific search engine and a general-purpose search engine, the audio input may be recognized using a first language model (e.g., a language model that has been trained on content related to the content indexed by the site-specific search engine) to generate a recognition result that serves as the basis for the query to be issued to the site-specific search engine and may also be recognized using a second language model (e.g., that has been trained on more general content), different from the first language model, to generate a recognition result that serves as the basis for the query to be issued to the general-purpose search engine.

In the example described above, the recognition result that is obtained by performing speech recognition using a language model that is associated with a particular search engine serves as the basis for the search query that is issued to that search engine. However, in some embodiments, rather than issuing recognition results obtained using different language models to different search engines, multiple recognition results may be obtained using different language models and the recognition result with the highest score or confidence value may serve as the basis of a search query that is issued to multiple search engines. For example, in FIG. 7, each of recognition results 705 may be generated by performing automatic speech recognition on audio data 701 using a particular language model. In some embodiments, one of recognition results 705 may be selected to be the result that serves as the basis for generating a search query to be issued to multiple search engines. This selection may be made in any suitable way. For example, as discussed above, the recognition result that has the highest score or confidence value as a result of the speech recognition may be selected or any other suitable criterion or combination of criteria may be used.

The inventors have recognized that, in situations in which speech recognition is performed on the same audio data using multiple language models, performing multiple separate and independent speech recognition processes with each of the different language models may increase the latency in obtaining recognition results and/or may increase the amount of processing resources used in performing speech recognition.

Thus, in some embodiments, rather than performing an entire independent speech recognition process on the audio data for each language model, one generalized language model may be used to create a lattice of hypothesized word sequences, and this lattice may be re-scored using one or more selected language models to yield recognition result(s) particularly for the selected language model(s). In this way, the time and processing resources consumed in generating the recognition results may be reduced because the same lattice is used in producing each recognition result and thus only needs to be generated once.

In the example of FIG. 7, audio data 701 is shown as being provided directly to each of language models 703. This depiction is provided merely to facilitate an understanding of how multiple language models may be used, and it should be understood that, in practice, the language models may not operate directly on audio data. For example, a lattice with multiple hypothesized sequences of words may be obtained from audio data using an acoustic model and a general language model, and specialized language models 703 may be used to rescore the general lattice and obtain a sequence of words appropriate to a specific search engine.

In some embodiments, rather than using multiple different language models in generating search queries to be provided to search engines, one language model may be selected from a plurality of available language models. For example, in some embodiments, one language model may be identified as being well-suited for recognizing a particular voice query, and that language model may be used in recognizing the query.

Any of a variety of possible criteria or combinations of criteria may be used to select a language model to be used in recognizing a particular voice query. For example, in some embodiments, the content of the query may be used as a basis for selecting a language model to be used. For example, a two-pass process may be used whereby in a first pass automatic speech recognition of a voice query or a portion of a voice query is performed using a general language model that doesn't have a specialized vocabulary. Such a language model may recognize some of the words in the query, but may not accurately recognize all of the words. The recognition result obtained from the first-pass may be used to classify the query based on topic or category. Any of a variety of well-known classification techniques may be used.

Based on the classification, a language model that has a specialized vocabulary directed to the identified topic or category may be selected. After selection of the language model, a second-pass of automatic speech recognition may be performed using the selected language model. For example, if after the first-pass it is determined that the voice query includes word such as "directions," "street," or "road," it may be determined that voice query is map-related query, and a map-related language model (e.g., a language model that includes city, street, and place names for the United States and/or other countries) may be selected and used in the second-pass.

As discussed in greater detail below, the recognition result from the second-pass may serve as the basis for one or more search queries to be provided to one or more search engines. In addition, as discussed in more detail below, the search engine or engines that are queried may be selected based on the language model that was selected to recognize the query in the second-pass or the content of the recognition result obtained from the second-pass.

In some embodiments, a language model that is used to recognize a voice search query supplied from a user as audio data may be updated based on topics of interest. This may be done in any of a variety of possible ways. The inventors have recognized that current events frequently result in search engines receiving a large number of search queries that include keywords associated with a particular event, including keywords that may have been previously unused and not the subject of frequent searches. For example, if a popular new movie is playing in movie theaters, search engines may receive a large number of search queries from different users that include the name of the movie, the names of the actors in the movie, or other keywords associated with the movie. Similarly, if a large sporting event is upcoming, search engines may receive a large number of queries that include the names of the teams and/or athletes participating in the event, or an event in popular culture may thrust a person previously unknown to the general public into the limelight (e.g., a person winning the lottery, a person accused of a high-profile crime, a person involved in a high profile scandal, etc.)

In some embodiments, words and/or phrases associated with topics of recent user interest may be identified, and the language model may be updated to improve the accuracy of recognizing these words and/or phrases. These words and/or phrases may be identified in any of a variety of ways. For example, in some embodiments in which user-supplied queries (e.g., in audio format, text format, or some other format) are provided from a plurality of client devices to a server or set of servers, the server or set of servers may identify frequently used search terms or phrases in these search queries and the language model may be updated based on these frequently used search terms. In other embodiments, words and/or phrases associated with topics of interest may be identified manually by one or more humans tasked with identifying such words or phrases.

The language model may be updated in this manner with any desired degree of frequency. For example, in some embodiments, the language model may be updated at a regular interval, such as once per day, once every two days, twice per day, once per week, or any of a variety of other possible intervals. In some embodiments, the language model may be updated in response to a user action, such as an indication from the user to update the language model or in any other suitable way.

In some embodiments, words provided in user search queries, words obtained from webcrawling, and/or words from other sources may be collected and used to update the language model. A word count indicating the number of occurrences of the words in the source data may be maintained and words whose word count exceeds a threshold value may be added to the language model.

In some embodiments, an auto-pronunciation (e.g., a sequence of phonemes) for each word to be added to the language model may be generated and included in the language model with its corresponding word. In some embodiments, a human reviewer (e.g., a linguist) may review and, if warranted, revise the automatically generated pronunciation before it is added to the language model.

In some embodiments, the language model used in automated speech recognition of search queries may be updated using feedback indicating which search results a user selected. This may be done in any of a variety of possible ways. For example, in some embodiments, an automated speech recognizer may generate a recognition result from audio data of a user-supplied voice search query. This recognition result may serve as the basis for one or more search queries that are provided to one or more search engines, and search results from the one or more search engines may be returned and displayed to the user in response to the query or queries. The user may select one or more of the search results to view a particular web page or piece of content. In some embodiments, information about which search result(s) the user selected may be used to update the language model used by the automated speech recognizer. For example, a user may speak the search query "Willie Mays" and the automated speech recognizer may incorrectly recognize the speech as "Willy Maze." As such, a search query for the phrase "Willy Maze" may be issued to one or more search engines. However, one or more of the search engines may return in its list of results a hyperlink to a web page with biographical information about Willie Mays. If the user selects this hyperlink to access that web page, the content of the web page may be used to update the language model. This may increase the likelihood that the next time a user speaks the phrase "Willie Mays," it will be correctly recognized.

In some embodiments, the language model that is used for a particular user may be customized to that user's speech, using previous utterances obtained from that user. This may be done in any of a variety of ways. For example, in some embodiments, voice data received from a particular speaker may be represented as a bag-of-word feature vector, with the goal of discovering a set of representative latent speakers to "explain" the data. The outcome is that, for example, similar speakers are clustered together in a probabilistic fashion. These clusters may be used to build a set of latent speaker language model components. Using these latent components, adaptation for a particular user is performed via estimating the speaker-specific linear interpolation weights of the language model components using the received voice data from the particular speaker for which adaptation is being performed.

In some embodiments, the language model that is used for a particular user may be updated based on the user's historical browsing information. This may be accomplished in any of a variety of ways. For example, based on the user's browsing history, web sites that are frequently visited may be identified. The language model that is used to recognize speech queries may be re-trained using a training corpus in which content from the frequently visited web sites is emphasized.

Any or all of the above-described techniques for selecting a language model to facilitate automated speech recognition can be used in combination with each other. In addition, it should be appreciated that these techniques for selecting a language model need not be used, and in some embodiments the same language model may be used to process all voice input.

II. Determining which Search Engines to Query

As discussed above, at act 203 in process 200, in response to receiving a user-specified query, the application program determines how many and which search engines to query. This may be accomplished in any of a variety of ways.

For example, in some embodiments, the set of search engines which are queried may be static. For example, the application program may be hard coded or otherwise configured to query a specific set of search engines. In such embodiments, the application program queries the same set of search engines in response to every user-supplied search query that it receives. Accordingly, in these embodiments, act 203 may be considered to be performed by executing the software code of the application program that determines the search engines to be queried simply by those search engines being identified by static information in or accessible by the application program.

In other embodiments, the determination of which search engines to query may be made dynamically based on one or more of a variety of possible criteria. For example, the search engines to be queried may be determined based on explicit instructions from the user indicating one or more search engines to query, may be determined based on the content of the query, may be determined based on historical browsing information or access patterns of the user that supplied the query, may be determined based on historical browsing information or access patterns of one or more other users different from the user that supplied the query, may be based on any combination of two or more of the above, and/or may be determined based on any one or more of a number of other possible criteria.

In some embodiments, the determination of which search engines to query using the above-listed criteria may be made by the application program executing on the client device. In other embodiments, the determination of which search engines to query using the above-listed criteria may be made by a computer external to the client device that executes the application program, and this computer may provide information identifying the search engines to be queried to the application program. In these embodiments, the application program determines which search engines to query from the information provided to it by the external computer.

Figure 8:
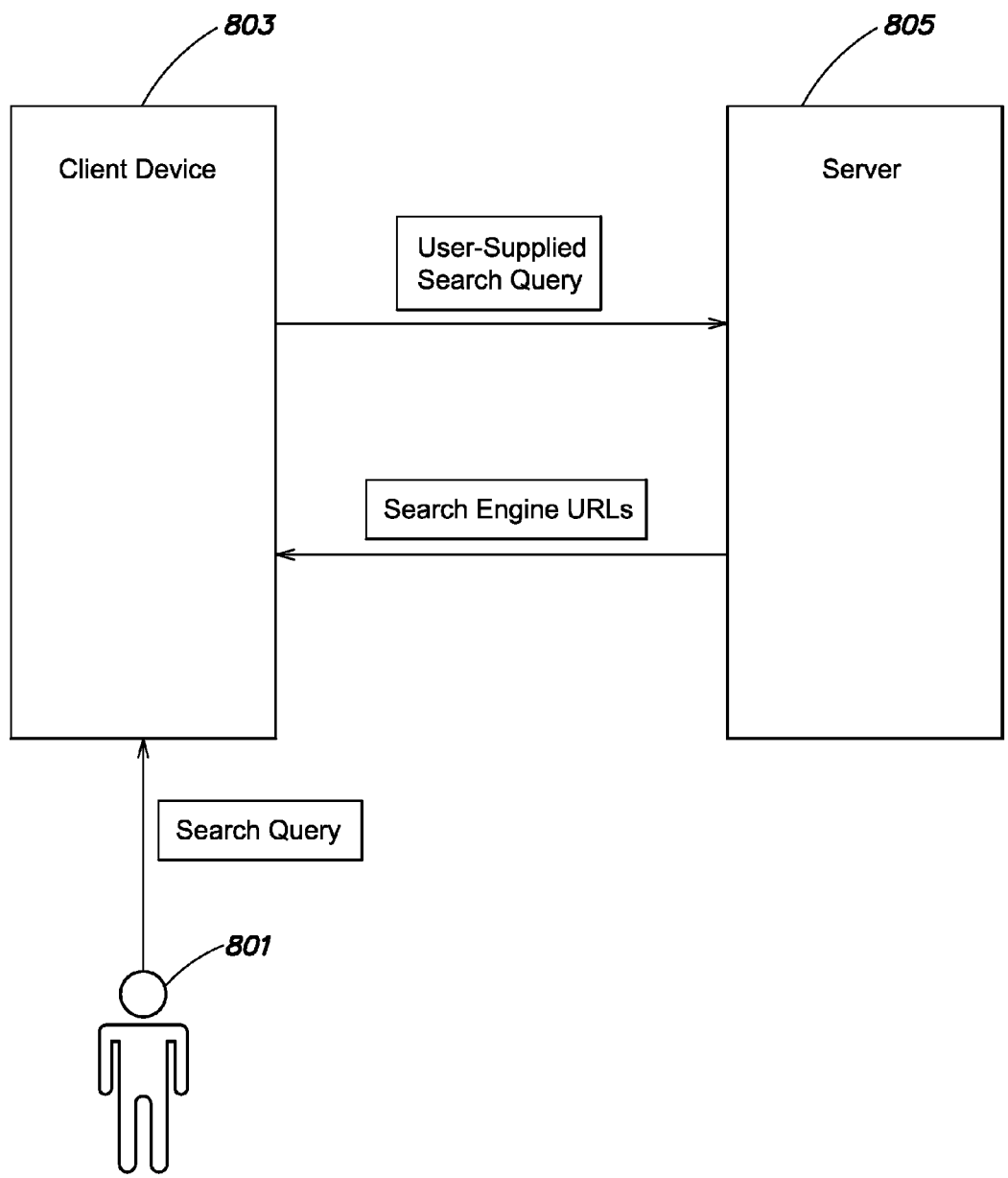
FIG. 8 is a block diagram of a server that instructs a client device which search engines to query in response to receiving a user-supplied search query, in accordance with some embodiments.

For example, in the illustrative environment in FIG. 6, the determination as to which search engine(s) to query may be made by server 605, and, based on this determination, server 605 may instruct the application program executing on the client device 603 which search engine(s) to query. In some embodiments, server 605 may instruct the application program as to which search engine(s) to query by providing to the application program Universal Resource Locators (URLs) for the search engines to be queried, wherein the URL for each search engine to be queried includes the search string, appropriately formatted for that search engine. For example, as shown in FIG. 8, the application program executing on client device 803 may receive a search query from a user 801, which may be in text format, audio format, or some other format. Client device 803 may pass the user-supplied search query to server 805, which may determine which search engines to query, generate URLs for the determined search engines with the appropriate search strings, and return the URLs to the application program on client device 803. In situations in which the user-supplied query is a voice query provided as audio data, server 805 may, in some embodiments, perform automated speech recognition on the audio data to generate a recognition result and determine which search engines to query based on the recognition result. In other embodiments, automated speech recognition may be performed on client device 803, and the recognition result, rather than the audio data, may be sent from client device 803 to server 805.

FIG. 9 shows an example of URLs that may be generated for three different search engines for the search query "Miles Davis." In embodiments in which the determination as to which search engines to query is made solely on the client device, the client device may generate the URLs for the different search engines. In some embodiments in which the determination as to which search engines to query is made on the server, the server may instruct the client device which search engines to query and the client device may generate the URLs for these search engines.

Some search engines cannot be queried with a simple URL. For example, for some search engines, the client first establishes a connection or session with the search engine, and then sends the query to the search engine. If such a search engine is identified as a search engine to be queried, a query based on the content of the user-supplied query may be generated in a format suitable for that search engine. Like the URLs, the query for such a search engine may be generated by the application program on the client device and/or by a computer external to the client device (e.g., server 605).

As discussed above, in some embodiments, the determination of which search engines to query may be made based, at least in part, on direct input from a user identifying which search engines he or she desired to be queried. For example, the user may select which search engines he or she desires to query from a list provided by the application program, the user may identify the search engine in the query (e.g., "give me the Wikipedia page for George Washington," or "give me the Yelp review for John Doe's Bar and Grill," etc.), or may provide this input in some other way.

In some embodiments, such input may be supplied each time the user provides a search query to the application program. In other embodiments this input may be supplied once by the user, the application program may store information identifying the user-indicated search engines, and each time a user-supplied search query is received, the application program may use this stored information to determine which search engines to query.

In some embodiments, instead of the application program storing this information, the application program may provide this information to an external computer (e.g., server 605 in FIG. 6) and the information may be stored thereon. Thus, when the user inputs a search query to the application program, server 605 may determine which search engines to query using this information and may instruct the application program to query these search engines (e.g., by providing URLs or in some other way).

As discussed above, one or more of the search engines to be queried may be determined based on the content of the user-supplied search query. In some embodiments, if a user-supplied search query includes the name of search engine from which the user-supplied search query requests content, that search engine may be selected as a search engine to be queried. For example, a user may provide the search query, "get me the wikipedia page on Miles Davis." Thus, the search engine for wikipedia.com may be selected as a search engine to be queried.

In some embodiments, one or more of the search engines to be queried may be determined based on the type of information that the user requests. For example, if the user provides a search query requesting information about shoes, a search engine for the web site of an online shoe retailer may be selected as a search engine to be queried. As another example, if a user provides a search query such as, "what is the current weather in New York City?" the search engine of a weather web site may be selected as a search engine to be queried.

As also discussed above, in some embodiments, one or more of the search engines to be queried may be determined based on historical browsing information or access patterns of the user that issued the query and/or historical browsing information or access patterns of one or more other different users. For example, if the historical browsing information indicates that a user very frequently selects links returned in search results from search engine A but very infrequently selects links returned in search results from search engine B, search engine A may be selected as a search engine to be queried, while search engine B may not be selected.

Similarly, in some embodiments, if the historical access patterns of other users indicate that other users frequently select links returned in search results from a particular search engine, that search engine may be selected as a search engine to be queried. For example, if the historical access patterns of other users indicates that users frequently select links for weather from search engine A and less frequently select links for weather from search engine B, then search engine A may be selected as a search engine to be III. Issuing Queries to Selected Search Engines As discussed above, at act 205 of process 200 the application program executing on the client device may issue search queries to the search engines identified in act 203. As explained above, the application program or a computer (e.g., a server) external to the client device may generate URLs or other types of search queries corresponding to each of the search engines, where each URL or query includes a search string that is based on the search query received from the user (e.g., the search query received at act 201 of process 200) and is formatted appropriately for its corresponding search engine.

At act 205, the application program may issue the search queries (e.g., by accessing the URLs) to cause each of the selected search engines to perform a search on the search string included in its corresponding URL.

In process 200 of FIG. 2, the search queries are issued by the application program executing on the client device, such that search results are returned from the search engines to the application program on the client device. This provides the advantage that the search engines that are queried do not receive a large volume of queries from the same server or IP address. As explained above, if the server were issuing queries to the search engine on behalf of a large number of clients, the search engines being queried may receive a very large number of queries from a single source, and may perceive this behavior as a single user issuing an enormous number of search queries to the search engine. Many search engine operators would consider this behavior to be an abuse of the search engine service and/or a potential denial of service attack and would take action to block search queries to their search engines from a source issuing such a large number of queries. By issuing the search queries from the client device, the search engines may perceive the queries as being issued from the client device that caused them to be issued, and may treat the issuance of such queries as normal user behavior.

However, in embodiments in which the URLs or queries are generated by a computer external to the client device (e.g., server 605 in FIG. 6), that computer may issue the queries, receive the search results from the corresponding search engines, and return those search results to the application program on the client device.

In some embodiments, the queries for each of the search engines selected in act 203 may be issued automatically in response to receiving the search query from the user in act 201. In other embodiments, the queries for all or some of the search engines selected in act 203 may not be issued to those search engines until the user provides input requesting to view the search results from those search engines. For example, the search results from some search engines may include a large amount of content. As one example, the search results from a search engine for a web site that hosts video clips may include a thumbnail image of each video included in the list of results. Consequently, transferring the search results from the search engine to the client device or external computer may take a relatively long time. The time taken to transfer the search results may be time that is not well spent if the user does not ever view the search results from that search engine. Thus, in some embodiments, search queries to search engines that return results including bandwidth-intensive content, such as a large number of images, video data, audio data, and/or other bandwidth-intensive content may not be issued automatically in response to receiving a user-supplied search query, while search queries to search engines that return results that do not include bandwidth-intensive content may be issued automatically.

It should be appreciated that the size of the content (or the expected size of the content) of a set of search results is one example of a criterion that may be used to determine whether to issue a search query automatically to a particular search engine or whether to await some user indication before issuing the query to that search engine. Any of a variety of other criteria or combinations of criteria may be used.

IV. Receiving Search Results from Search Engines

As discussed above, at act 207 of process 200, the application program executing on the client device may receive search engine results generated by the search engines queried in act 205. The search engine results may be received in any of a variety of possible ways. In embodiments in which the client device issued the search queries to these search engines, each search engine may provide its results directly to the client device. In embodiments in which an external computer (e.g., server 605 in FIG. 6) issued the search queries to the search engines, each search engine may provide its results to the external computer, and the external computer may provide these results to the client device.

The results may be received in any of a variety of formats. Some search engines provide results as a hypertext markup language (HTML) web page that includes a list of hyperlinks to the content and/or web pages identified as relevant to the search query. Other search engines may provide results in different formats. It should be appreciated that the application program may receive results in any of a variety of formats and all of the search results received need not be in the same format.

V. Displaying Search Results

At act 209 of process 200, the application program may cause the search results received in act 207 to be displayed on a display device integrated into or coupled to the client device. The results may be displayed in any of a variety of formats and may be presented in any of a variety of possible ways.

For example, in some embodiments, the search results from search engines that provide search results as an HTML web page may be displayed by rendering the HTML code in the web page. This is different from the displayed results from metasearch engines such as the above discussed Dogpile™, which do not render the HTML code received from a search engine, but rather extract links from this HTML code and generate new HTML code to display the extracted links.

For search results that are not received in HTML format, HTML code may be automatically generated to display the received search results, and these search results may be displayed by rendering the automatically generated HTML code.

In some embodiments, the search results from each search engine may be displayed as visually separated from the search results from other search engines, so that it is clear to the user viewing the search results which search engine provided each set of search results. In addition, in some of such embodiments, the order of the list of search results returned from each search engine may be preserved in the displayed search results for each search engine, such that the user may view how relevant each search engine determined each search result in its list to be.

Search results from each search engine may be visually separated from each other in any of a variety of possible ways. For example, in some embodiments, search results from multiple search engines may be displayed concurrently on the display, separated by columns, lines, or in some other way. In some embodiments, only one of the search engines' search results may be displayed on the display at any given time, and the user may control which of the search engines' search results are displayed by selecting an icon, button, or other user interface element.

Figure 10:
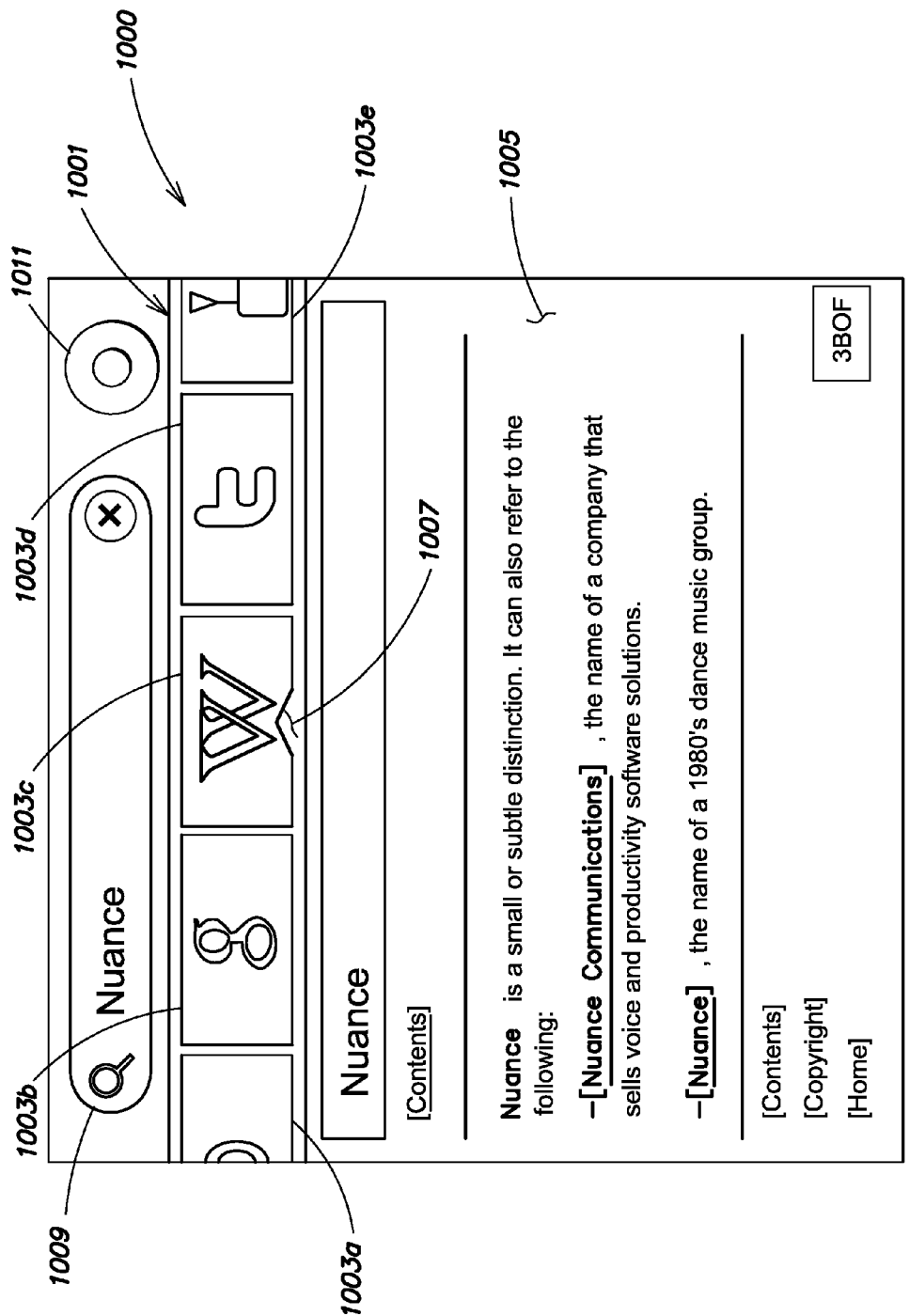
FIG. 10 is a diagram of a display of a client device in which search results from multiple search engines may be displayed.

In some embodiments, a carousel having a plurality of slots may be displayed on the display device, with each slot corresponding to one of the search engines from which search results were received. User selection of one of the slots of the carousel causes the search results from the search engine corresponding to the selected one of the slots to be displayed on the display. FIG. 10 shows an example of a display 1000 that employs such a carousel. FIG. 10 is a screenshot of a search result from the Dragon Search™ application available from Nuance Communications, Inc., of Burlington, Mass. for the iPhone™ available from Apple Computer, Inc. of Cupertino, Calif. The screenshot of FIG. 10 is one example of a variety of possibilities that may be used to display search results from multiple search engines.

In FIG. 10, display 1000 comprises a first area in which a carousel 1001 is displayed. Carousel 1001 comprises a number of slots 1003a, 1003b, 1003c, 1003d, and 1003e, each of which corresponds to a search engine from which search results were received in act 207. As discussed above, the search engines to which the slots 1003 correspond may include general purpose search engines and/or site-specific search engines, such that the search results provided in response to one user-supplied query may come from multiple different search engines (some of which could be general purpose search engines and some of which could be site-specific search engines).

In some embodiments, the search engine to which each slot corresponds may be identified by displaying a symbol, icon, text, image or other information in each slot that is indicative of the search engine corresponding to the slot. Because, in some embodiments, the search engines that are queried in response to a user-supplied query received at the client device may be determined dynamically, the search engines that are allocated to the slots in the carousel may also be determined dynamically. That is, for example, a slot may be allocated in the carousel for each search engine selected in act 203 of process 200 as a search engine to be queried. As such, it should be understood that, in embodiments in which a user specifies (either directly or indirectly) which search engines are to be queried, a user may configure which search engines are to be allocated to the slots in the carousel. In addition, in some embodiments, the allocation of carousel slots to particular search engines may be made based on the results returned by the search engines. For example, if one of the search engines selected at act 203 of process 200 as a search engine to be query does not return any search results or returns an indication that no search results were found as a result of the query, a slot in the carousel may not be allocated for that search engine, and the page returned from that search engine may not be displayed to the user.

Display 1000 may also include an area 1005 in which search results are displayed. User selection of one of the slots 1003 in carousel 1001 causes the results received from the search engine corresponding to the selected slot to be displayed in area 1005. Because the results that are displayed in area 1005 when a slot 1003 is selected depends on the query received from the user, the content displayed in area 1005 may be different for each different user-issued query. That is, for example, when a user selects slot 1003b in carousel 1001, the content displayed in area 1005 may be different for the query "Miles Davis" than for the query "George Washington." Thus, rather than displaying the same content each time a slot is selected, different content may be displayed for different search queries issued by the user. In this sense, the content that is displayed is response to user selection of a carousel slot can be considered to be "dynamic."

Display 1000 may also comprise an indicator (e.g., an arrow or some other type of indicator) 1007 that indicates which slot 1003 in carousel 1001 is currently selected. This indicator identifies to the user which search engine's search results are being displayed in area 1005.

Display 1000 may also comprise a query field 1009. The search query displayed in field 1009 indicates to the user the basis of the search query that was issued to each of the search engines from which search results were received. As should be appreciated from the discussion above, in some embodiments different search queries that are all based on the user-supplied search query may be issued to different search engines. In such embodiments, query field 1009 may display the user-supplied query that served as the basis for each of the different search queries issued in response to that query.

A user may input a search query into field 1009 in any of a variety ways. In some embodiments, a user may provide text input to field 1009 (e.g., via a physical or touch screen keyboard). In some embodiments, a user may provide voice input to field 1009. In the example of FIG. 10, when a user wishes to supply voice input to field 1009, the user may select button 1011 and speak his or her search query into a microphone on the client device.

In some embodiments, when search results are received from the search engines queried in act 205 of process 200, one carousel slot may be selected by default, such that one search engine's results are automatically displayed in area 1005. The default carousel slot may be selected in any of a variety ways. For example, the default carousel slot may be selected based on which search engine's results the user views most frequently, based on the content of the user's query, based on which search engine provides the most general results, and/or based on any other suitable criterion or criteria.

In addition, not all of the results returned from a particular search engine in response to a query may fit in area 1005 at once. Thus, in some embodiments, a user may be provided with the capability to scroll up and down the list of search results and/or adjust the zoom level at which results are displayed so as to adjust which portion of the search results are displayed in area 1005.

In addition, the order of the search engines in the carousel slots may be selected in any of a variety of ways. In some embodiments, the search engines may be ordered in the carousel based on frequency of use by the user, based on the content of the user's query, and/or based on any other suitable criterion or criteria.

As shown in FIG. 10, due to the size of the display, not all of the slots of carousel 1001 may be able to be displayed on the display at one time. For example, in FIG. 10, slots 1003a and 1003e are only partially displayed. In addition, carousel 1001 may include additional slots that are not displayed at all in FIG. 10. In some embodiments, the user may adjust which slots of the carousel are displayed by shifting the carousel to the right side and/or to the left side of the display. This may be accomplished in any of a variety of ways. For example, the user may drag the carousel in one direction using a pointer device such as a mouse. In embodiments in which display 1000 is displayed on a touch screen, a user may drag the carousel in one direction using his or her finger.

In some embodiments, carousel 1001 may wrap-around display 1000. Thus, for example, if the user continuously drags carousel 1001 to the left side of display 1000, the slots of carousel 1001 moving the left will move off of the left side of the display and will eventually re-enter the display on the right side. In this respect, dragging carousel 1001 in a particular direction can be thought of as rotating the carousel in that direction.

VI. Monitoring User Actions

As discussed above, when search results from one or more search engines are displayed to a user, the user may view some or all of the lists of search results, and may access hyperlinks to view web pages or content identified in the lists of results.

In some embodiments, the application program may monitor user actions taken with respect to the search results and may store information about the monitored user actions. The monitored actions can take any suitable form, as the aspect of the invention relating to monitoring user actions is not limited in this respect. In some embodiments, the monitored user actions may include, for example, which search engines' search results the user viewed and what web pages and/or content the user accessed.

The information describing the monitored user actions may be subsequently used to update language models used in automatic speech recognition of voice queries, determine which search engines to query in response to subsequent user queries, determine how search engine results are to be presented (e.g., determine which carousel slot is the default slot and/or in what order the search engines are to be positioned in the carousel slots), and/or to facilitate various other aspects of querying search engines and/or displaying search engine results.

In embodiments in which a computer external to the client device uses such information to facilitate any of the above-discussed aspects of querying a search engine, the client device may send the monitored information to the external computer. The external computer may associate this information with the client device, the user of the client device, and/or the network address from which the information was sent, and may store it for subsequent use.

VII. Additional Implementation Detail

Figure 11:
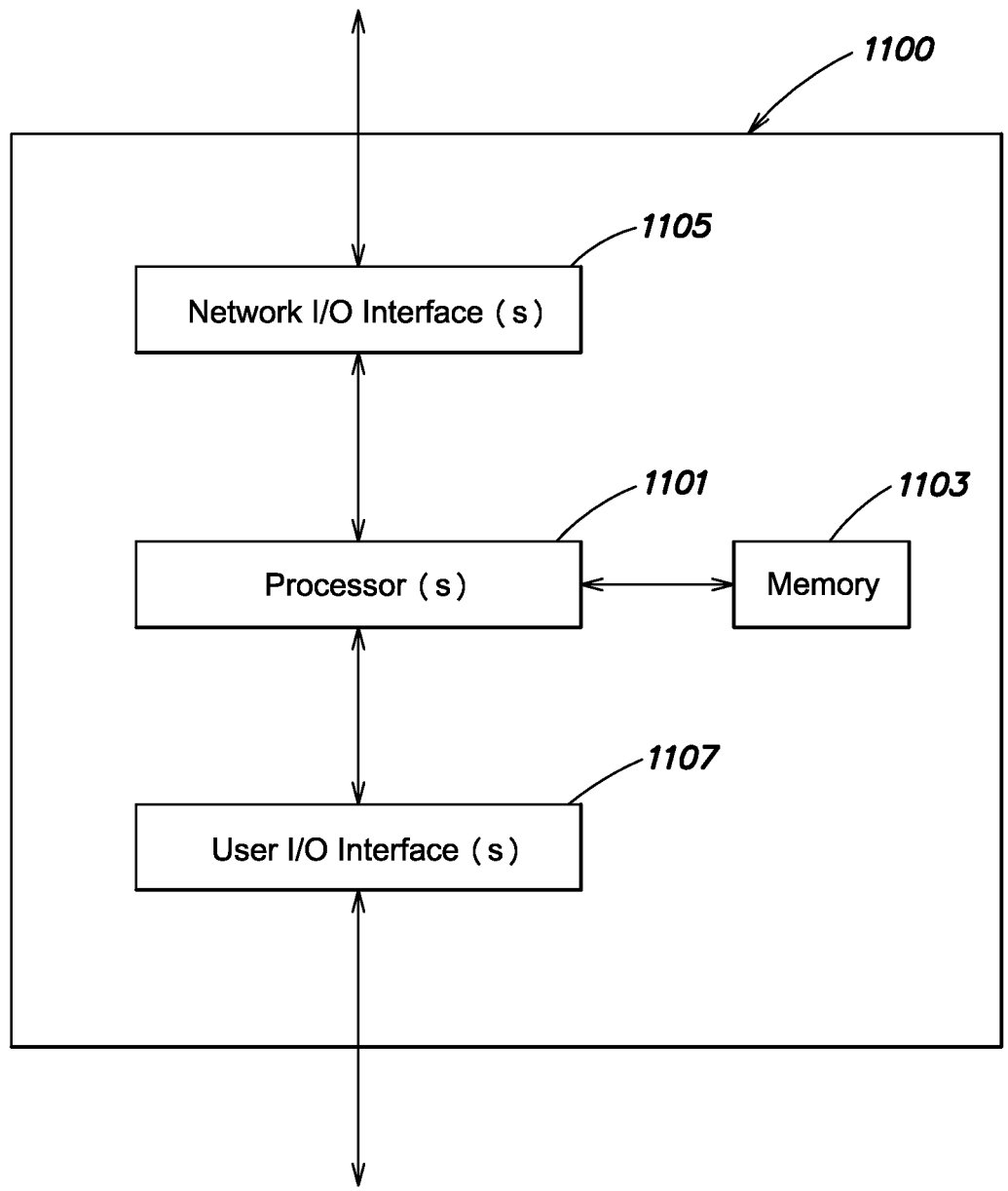
FIG. 11 is a block diagram of an illustrative computing device on which aspects described below may be implemented.

The above discussed computing devices (e.g., client devices, servers, external computers, and/or any other above-discussed computing devices) may be implemented in any of a variety of ways. FIG. 11 is a block diagram an illustrative computing device 1100 that may be used to implement any of the above-discussed computing devices.

The computing device 1100 may include one or more processors 1101 and one or more tangible, non-transitory computer-readable storage media (e.g., memory 1103). Memory 1103 may store, in tangible non-transitory computer-readable storage media computer instructions that implement any of the above-described functionality. Processor(s) 1101 may be coupled to memory 1103 and may execute such computer instructions to cause the functionality to be realized and performed. Computing device 1100 may also include a network input/output (I/O) interface 1105 via which the computing device may communicate with other computers (e.g., over a network), and may also include one or more user I/O interfaces, via which the computer may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of various embodiments of the present invention comprises at least one tangible, non-transitory computer-readable storage medium (e.g., a computer memory, a floppy disk, a compact disk, and optical disk, a magnetic tape, a flash memory, circuit configurations in Field Programmable Gate Arrays or other semiconductor devices, etc.) encoded with one or more computer programs (i.e., a plurality of instructions) that, when executed on one or more computers or other processors, performs the above-discussed functions of various embodiments of the present invention. The computer-readable storage medium can be transportable such that the program(s) stored thereon can be loaded onto any computer resource to implement various aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method, implemented at least in part via a server comprising at least one hardware computer processor, of facilitating a search for content via the Internet, the method comprising:
   receiving a first search query from a client device;
   identifying at least one search engine to be queried;
   generating at least one second search query, wherein the at least one second search query is generated based, at least in part, on the content of the first search query, and wherein the at least one second search query comprises at least one formatted search query that is formatted for the at least one search engine; and
   sending, to the client device, the at least one second search query, including the at least one formatted search query, and information specifying the identified at least one search engine to be used by the client device in performing an Internet search using the at least one second search query and the information specifying the identified at least one search engine;
   wherein the first search query is in audio form, and wherein generating the at least one second search query further comprises generating the at least one second search query, at least in part, by performing speech recognition on the first search query using a first language model associated with the identified at least one search engine; and
   wherein the identified at least one search engine is a site-specific search engine.

2. The method of claim 1, wherein the first search query is the same as the second search query.

3. The method of claim 1, wherein the identifying at least one search engine to be queried is based on explicit input in the first search query.

4. The method of claim 1, wherein the first search query has content, and wherein the identifying at least one search engine to be queried is based on the content of the first search query.

5. The method of claim 1, wherein the first language model was trained on content indexed by the site-specific search engine.

6. The method of claim 1, wherein the identifying the at least one search engine to be queried comprises identifying the at least one search engine from among a plurality of search engines, wherein the first language model is associated with at least one other of the plurality of search engines.

7. The method of claim 6, wherein the at least one other search engine comprises a general-purpose search engine.

8. At least one non-transitory computer-readable medium encoded with instructions that, when executed by a server comprising at least one hardware computer processor, perform a method of facilitating a search for content via the Internet, the method comprising:
   receiving a first search query from a client device;
   identifying at least one search engine to be queried;
   generating at least one second search query, wherein the at least one second search query is generated based, at least in part, on the content of the first search query, and wherein the at least one second search query comprises at least one formatted search query that is formatted for the at least one search engine; and
   sending, to the client device, the at least one second search query, including the at least one formatted search query, and information specifying the identified at least one search engine to be used by the client device in performing an Internet search using the at least one second search query and the information specifying the identified at least one search engine;
   wherein the first search query is in audio form, and wherein generating the at least one second search query further comprises generating the at least one second search query, at least in part, by performing speech recognition on the first search query using a first language model associated with the identified at least one search engine; and
   wherein the identified at least one search engine is a site-specific search engine.

9. The at least one non-transitory computer-readable medium of claim 8, wherein the first search query is the same as the second search query.

10. The at least one non-transitory computer-readable medium of claim 8, wherein the first language model was trained on content indexed by the site-specific search engine.

11. The at least one non-transitory computer-readable medium of claim 8, wherein the identifying the at least one search engine to be queried comprises identifying the at least one search engine from among a plurality of search engines, wherein the first language model is associated with at least one other of the plurality of search engines.

12. The at least one non-transitory computer-readable medium of claim 11, wherein the at least one other search engine comprises a general-purpose search engine.

13. The at least one non-transitory computer-readable medium of claim 8, wherein the identifying the at least one search engine to be queried is based on the content of the first search query.

14. A server comprising:
at least one tangible memory that stores processor-executable instructions for facilitating a search for content via the Internet; and
at least one hardware computer processor, coupled to the at least one tangible memory, that executes the processor-executable instructions to:
  receive a first search query from a client device;
  identify at least one search engine to be queried;
  generate at least one second search query, wherein the at least one second search query is generated based, at least in part, on the content of the first search query, and wherein the at least one second search query comprises at least one formatted search query that is formatted for the at least one search engine; and
  send, to the client device, the at least one second search query, including the at least one formatted search query, and information specifying the identified at least one search engine to be used in performing an Internet search using the at least one second search query and the information specifying the identified at least one search engine;
wherein the first search query is in audio form, and wherein the at least one hardware computer processor generates the at least one second search query by generating the at least one second search query, at least in part, by performing speech recognition on the first search query using a first language model associated with the identified at least one search engine; and
wherein the identified at least one search engine is a site-specific search engine.

15. The server of claim 14, wherein the first search query is the same as the second search query.

16. The server of claim 14, wherein the first language model was trained on content indexed by the site-specific search engine.

17. The server of claim 14, wherein the at least one hardware computer processor, executes the processor-executable instructions to identify the at least one search engine to be queried from among a plurality of search engines, wherein the first language model is associated with at least one other of the plurality of search engines.

18. The server of claim 17, wherein the at least one other search engine comprises a general-purpose search engine.

19. The server of claim 14, wherein the at least one hardware computer processor, executes the processor-executable instructions to identify the at least one search engine to be queried based on the content of the first search query.

* * * * *